Patented June 1, 1943

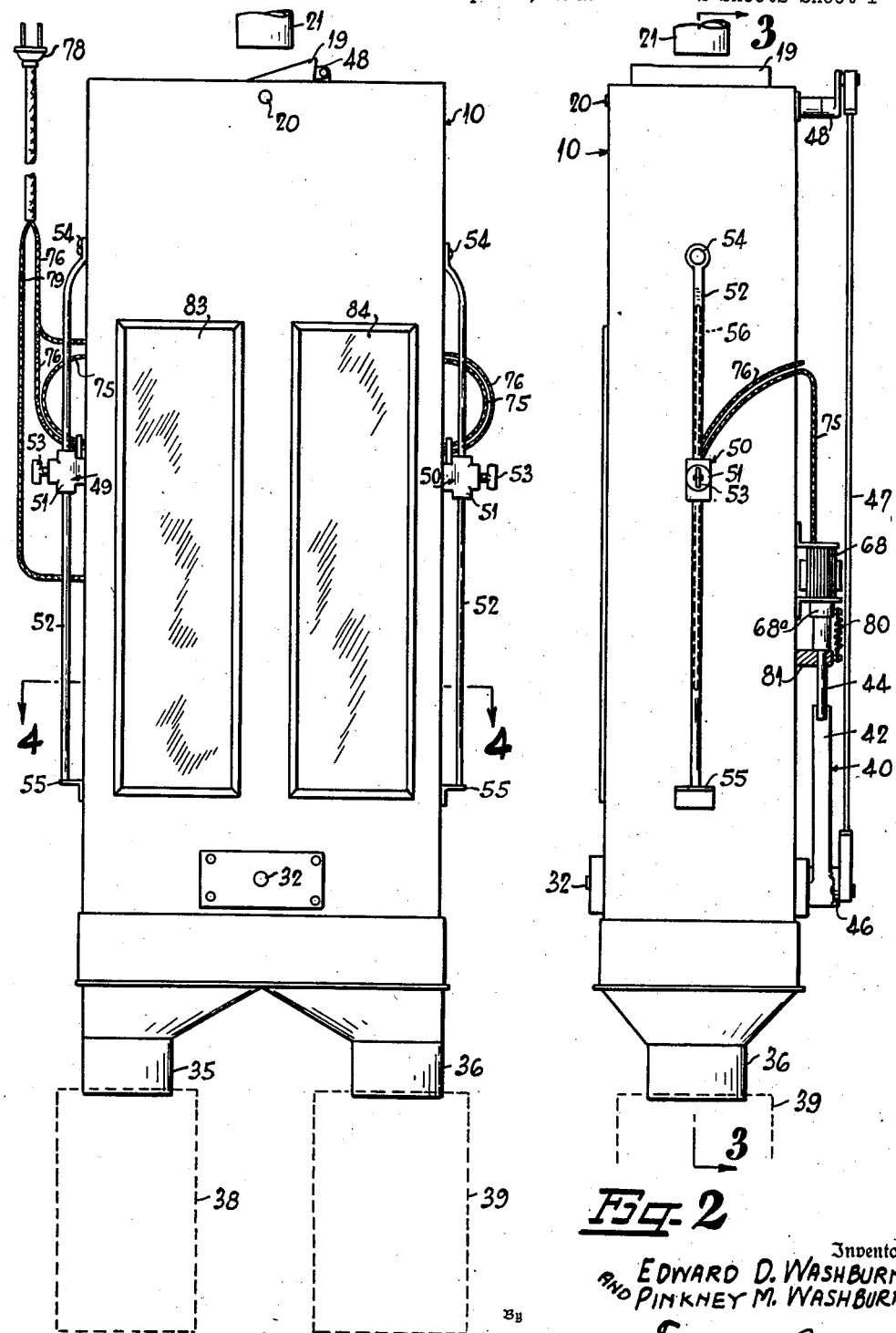

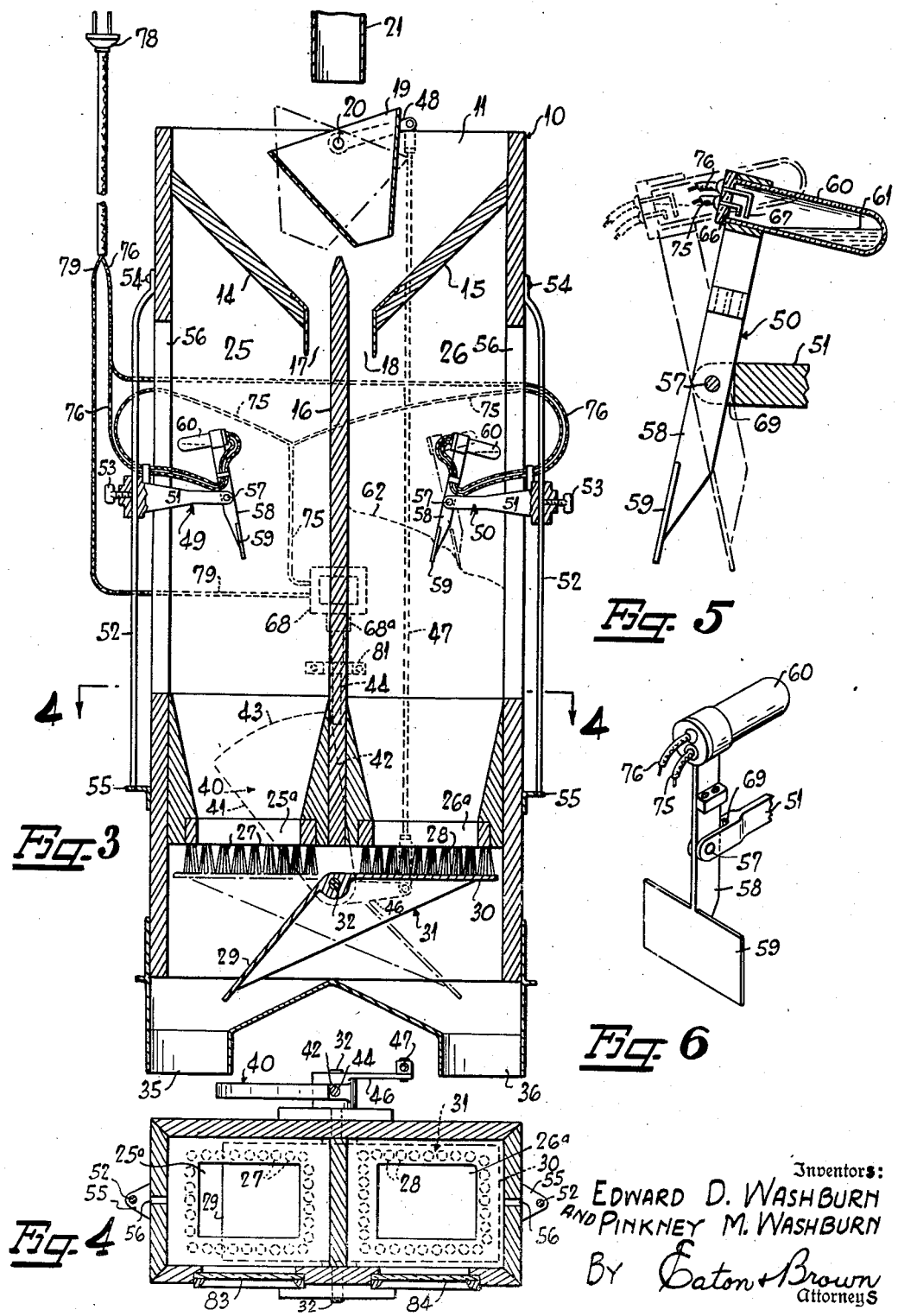

2,320,767

UNITED STATES PATENT OFFICE 2,320,767

AUTOMATIC MEASURING APPARATUS

Edward D. Washburn and Pinkney M. Washburn, Shelby, N. C.

Application September 2, 1942, Serial No. 457,008

4 Claims. (Cl. 73—219)

This invention relates to measuring devices and more particularly to an apparatus capable of measuring predetermined quantities of material.

It is an object of this invention to provide a measuring apparatus which may be employed for successively and automatically measuring given volumes of material as it flows from a storage supply.

The present invention is especially adapted for use where bulk materials such as grain, corn meal, feedstuffs, and the like are to be measured and sacked. Since this apparatus operates when a certain volume of material has been measured, it is evident that minor additions or subtractions of the measured material will have to be made when an equal weight of each measurement is desired for materials of different densities.

It is another object of this invention to provide a measuring device of the class described wherein the measured volume may be infinitely varied between certain limits, thereby making the device more adaptable.

It is another object of this invention to provide a measuring device in which a pair of measuring chambers are employed for alternately receiving and discharging given volumes of material, in combination with an electro-magnetic means, and a mercury switch for controlling the receiving and discharging mechanism. This specific structure makes the apparatus extremely sensitive and therefore insures accuracy in the measurement.

Some of the objects of the invention having been stated, other objects will appear as the description proceeds when taken in connection with the accompanying drawings in which:

Figure 1 is an elevation of an improved measuring apparatus made in accordance with the present invention;

Figure 2 is an elevation with certain portions thereof in section, and looking at the right-hand face of Figure 1;

Figure 3 is a vertical sectional view taken along the lines 3—3 in Figure 2;

Figure 4 is a sectional plan view taken along the lines 4—4 in Figures 1 and 3;

Figure 5 is an enlarged sectional detail view showing the material feeling element and mercury switch associated therewith, said view being shown both in bold and dot-dash line positions;

Figure 6 is an isometric view of the material feeling element and associated mercury switch.

Referring more particularly to the drawings, the numeral 10 broadly denotes an improved measuring device, said device having a hopper compartment 11 having in its upper end a pair of inwardly and downwardly inclined boards 14 and 15. The lower ends of these boards are disposed in spaced relation to the opposed faces of a central partition 16. This partition has its upper end extending a substantial distance above the lower ends of the inclined boards 14 and 15, thereby providing restrictions or passageways 17 and 18 on opposed sides of the partition 16.

The hopper 11 has pivotally mounted therein immediately above the top of partition 16 as at 20 a deflector funnel 19, said funnel being adapted to be oscillated back and forth from bold line to dot-dash line position during the operation of the present device. Immediately above the member 19 is a spout 21 which supplies grain or other materials to the funnel. It is evident that the material which falls from the spout 21 will be directed by the funnel member 19 to one side or the other of the partition 16, depending upon whether the funnel is in bold line or dot-dash line position.

The partition 16 divides the measuring device into separate parallel compartments or containers 25 and 26. The discharge openings 25a and 26a of compartment 25 and 26 have rows of bristles 27 and 28 respectively surrounding the same and the lower ends of these bristles are adapted to be contacted by wings 29 and 30 respectively of closure member 31, said closure member being pivoted intermediate its ends upon a shaft 32. By providing the bristles 27 and 28 around the edges of the discharged openings, particles of grain or other materials are prevented from interfering with complete closing of the closure member 31, and thus affecting the smooth operation of the machine. In other words, should material become lodged between the upper sides of the wings and the bristles, the lodged material will be pressed between the bristles to permit the wings to move to the same closing position as they would, should there be no lodged material present.

Disposed below the openings 25a and 26a are a pair of spouts 35 and 36 respectively from which the contents of the respective compartments are discharged into other containers such as sacks 38 and 39 respectively. When the deflector funnel 19 is in the bold line position shown in Figure 3, the material flows from spout 21 through funnel 19 onto inclined board 15 and then downwardly through passageway 18 into compartment 26. At this time, the wing 30 of the closure member 31 serves to close the bottom of compartment 26 and therefore, the material will be held in this compartment until it reaches a predetermined level, after which a tripping mechanism, to be later described, will come into action to cause the wing 30 to be released and allow the contents from the compartment 26 to be discharged by way of spout 36 into container 39. During the discharge of the material from compartment 26, the wing 29 will serve to close the bottom of adjacent compartment 25 and also the deflector funnel 19 will assume dot-dash line position to deflect the contents into the compartment 25.

The above-recited operations are controlled by an electromagnetic circuit, a latch, a material feeler, and a mercury switch. By observing Figures 2 and 3, it can be seen that the shaft 32 projects to the back side of the measuring device 10 and has fixedly secured thereon a cam member 40. The shape of this cam member roughly resembles a sector of a circle. The two sides 41 and 42 of the cam are substantially radial with respect to shaft 32 and its upper side 43 being circular, using the shaft 32 as a center. In the position shown in the drawings, the radial side 42 is being engaged by a latch member 44, at which time material is flowing into compartment 26, but when the material is caused to flow into compartment 25 as previously described, the cam 40 will have been rotated in a clockwise manner in Figure 3 to a position where this same latch 44 will engage the radial side 41. Therefore, the latch 44 is employed in association with cam 40 for holding wings 29 and 30 beneath the compartment 25 and 26 respectively when these compartments are being filled.

Extending from the cam 43 and shaft 32 is an arm 46, said lever having its free end connected to the lower end of a link 47. This link 47 extends upwardly and is secured to the free end of a second arm 48 which, in turn, is fixedly secured upon pivot shaft 20. When the contents from the compartment 26 are discharged, the closure member 31 will move to occupy the dot-dash line position in Figure 3. At the same time, the cam 40 will rotate a corresponding amount to cause the latch member 44 to engage the radial side 41 and hold the wing 29 beneath the compartment opening 25a. Also during the discharge from compartment 26, the arms 46 and 48 will have been rotated to position the deflector funnel 19 in dot-dash line position, and thereby have its lower end disposed over the compartment 25.

In order for the above-named operations to be effectively carried out, it is essential that a very sensitive feeling mechanism be provided so that when the material within either of the compartments 25 or 26 reaches a predetermined level, the feeding and discharging mechanism will be quickly actuated. Unless a sensitive mechanism is employed, the utility of the present invention will be greatly decreased, because it is necessary for substantially the same quantities to be successively deposited in containers such as 38 and 39.

Figures 3, 5, and 6 show in detail the feeler mechanism and the switch assembly which controls the feeding and discharging means, there being such an assembly disposed in each of the compartments. In the description reference will be made to only one assembly, and like reference characters will be given to the other. These assemblies are broadly designated by the reference characters 49 and 50 and each specifically comprises a bracket 51, one end of which is adjustably secured upon a vertical rod 52 by any suitable means such as a set screw 53. It can be seen that the rod 52 is secured upon the outside face of the measuring device 10 as at 54 and 55, and in a substantially parallel relation to a very narrow slot 56 in the side wall of the device. The bracket 51 projects inwardly through the slot 56 and into compartment 26, and the inner end of the bracket has pivotally secured thereto as at 57 a lever 58, said lever having a feeler plate 59 integral with the lower end thereof and having a mercury tube 60 secured on its upper end. This mercury tube has a supply of mercury 61 on the interior thereof which serves as a conductor medium when the parts of the assembly are shifted to dot-dash line position in Figures 3 and 5.

When the material reaches the dotted line level 62 in compartment 26, the feeler plate 59 is engaged by the outward flow of material from central partition 16 and therefore, members 58, 59, 60, and 61 will be rotated. This rotation will tilt the mercury tube 60 and cause the supply of mercury 61 to flow to the other end thereof to cover suitable terminals 66 and 67 which, in turn, will supply current to a solenoid 68 through a circuit to be later described. When the solenoid 68 is energized, the latch member 44 will be actuated to permit cam 40 and closure member 31 to shift positions. It should be noted, however, that each assembly 49 and 50, comprising members 58, 59, 60, 61, 66 and 67, is so balanced that it will normally return to bold line position as shown in Figure 5, and that it is only when the material 62 engages the feeler plate 59 that the abovementioned members will rotate to cause the mercury tube to tilt and close the circuit between contacts 66 and 67.

As a means for limiting the amount of oscillation of lever 58, a slot 69 of a suitable depth has been cut in the end of bracket 51. This slot will limit the rotation of the lever in both directions to insure that the center of gravity of the entire assembly will always remain to the right of the pivot point 57 in Figure 5. Therefore, when there is nothing contacting the feeler plate 59, the parts will always tend to return to bold line position, and the circuit between terminal 66 and 67 will be normally open.

Another important feature in the construction of the present invention is in the location of the feeler units as shown in Figure 3 relative to the inflowing material. It will be noted that the feeler unit in each compartment is located beneath an inclined board 14 or 15, and out of the path of the falling material which enters the compartment through restricted passageways 17 and 18. This type of construction permits the compartment to be filled with material to the desired level before any of the material engages the feeler unit, and consequently the operation can be made considerably more sensitive than otherwise would be the case.

If it is desired to vary the amount of material which will be disposed in either of the compartments 25 and 26 before the feeler mechanism operates, it is only necessary to loosen the screw 53 and raise or lower the entire assembly upon the rod 52. For example, it might be desired to feed a predetermined quantity of material in compartment 25 before discharging the same; and next place another predetermined quantity of a different amount in compartment 26; and successively repeat this operation. Such an operation can be effected by placing the feeler units at different elevations on their respective rods 52.

The terminals 66 and 67 have wires 75 and 76 respectively leading therefrom, said wire 75 leading to one side of solenoid 68 and wire 76 leading to a suitable source of electrical supply such as plug 78. From the other side of the solenoid 68 a wire 79 leads to the plug 78 previously mentioned to complete the circuit. It will be noted that both of the feeler units 49 and 50 are wired in parallel so that when either one of the feelers is actuated by the level of the material within its respective compartment, the solenoid 68 will be energized to cause the latch rod 44 to be raised. It is, of course, evident that the rod 44 must be connected to a suitable solenoid core 68a which slidably penetrates the solenoid windings in a conventional manner.

As a means for normally holding the rod 44 and the associated solenoid core in a downward position at all times, such as shown in Figures 2 and 3, a suitable tension spring 80 is employed. One end of this tension spring is connected to the solenoid core 68a and its other end is connected to a bracket 81 which serves as a guide for the rod 44 during its vertical sliding movement.

By observing Figures 1 and 4, it can be seen that the compartments 25 and 26 have transparent panes 83 and 84 in one side wall thereof so that the elevation of the material within the compartments may be ascertained at a glance by the operator.

It is therefore seen that we have provided a simple apparatus capable of automatically and successively measuring predetermined volumes of materials such as grain or the like, and also which is capable of being continuously actuated during the intake flow of the material to be measured. As above pointed out, the mercury switch in association with elements 51, 58, and 59 make the actuation of the present device extremely sensitive and therefore, practically the same quantity of material in the measuring compartment will actuate the feeler mechanism each time. If the weight of the flowing material is not uniform, of course, a subsequent addition or subtraction of material will have to be made in the measured quantities if a uniform weight in each measured volume is desired.

It should be noted that the essence of the present invention largely resides in a feeler unit 49 or 50 and in the electro-magnetic mechanism actuated thereby. The principal reason for employing a plurality of containers is to expedite the measuring operation and therefore measure a greater amount of material.

Another important factor in the present invention is the means employed for feeding the material into the container at a selected area thereby causing the rising top level of the material to always flow at an incline. This downwardly flowing top level is employed for actuating the feeler mechanism when a predetermined level is reached to thereby divert or stop the inflowing material and simultaneously expel the measured material from the container.

In the drawings and specification, there has been set forth a preferred embodiment of the invention, and although specific terms are employed, they are used in a generic and descriptive sense only and not for purposes of limitation, the scope of the invention being defined in the claims.

We claim:

1. A measuring device for coarse material such as grain, feed-stuff, and the like, a pair of juxtaposed measuring containers, a movable material deflector adapted to communicate with said containers one at a time, a pivoted bottom member adapted to close the lower ends of said containers one at a time, a weighted arm having one end fixed to said bottom at its pivot point, a pivoted lever disposed within each container, a normally opened mercury switch on one end of each of said levers, and a material feeler on the other end of each of said levers, electro-magnetic means connected to each of said switches for engaging the weighted arm and holding the bottom member in position to close the bottom of one of the containers at one time, said electro-magnetic means being controlled by said switches one at a time for releasing said arm, and allowing the weight of the material within the compartment to swing the bottom member on its pivot to where the bottom member will engage the lower end of the other container to close the same, a connection between said bottom member and said deflector for moving the deflector when the bottom member is moved, each of said levers being moved by the weight of the material when the material reaches a predetermined high point in a container.

2. In a measuring device for coarse material such as grain, feed-stuff, and the like, a pair of side-by-side measuring containers, said containers each having open lower and upper ends, a bottom member pivoted substantially at its center and at a point between the lower open ends of said containers, a weighted arm having one end fixed to the pivot point of said bottom member for holding the bottom member in a position to close the lower end of one of the containers, a pivoted material feeding member disposed above the containers, a connection between said bottom member and the material feeding member for swinging the material feeding member when the bottom is swung to deflect the material into the container whose bottom is closed, a latch for engaging one edge of the weighted arm for holding it in closed position against the weight of material which is being delivered into the container, a solenoid for moving said latch, each of said containers having disposed therein a pivoted material feeling member, each material feeling member having mounted thereon a mercury switch and connections between the switches and the solenoid, the material feeling members being adapted to be engaged by the material in a container when the material reaches a predetermined height to move the material feeling member to thus close its mercury switch and energize said solenoid to move said latch to release said bottom member for swinging movement under the weight of the material in the closed container to allow the contents to flow by gravity from the filled container to thus move the bottom member on its pivot so that it will close the lower end of the other container, said weighted arm on said bottom member having a cam surface on which the lower end of said latch is adapted to ride while the bottom is swung, said latch being adapted to fall by gravity and engage the other side of said weighted arm to likewise hold the bottom in closed position for the other container while it is being filled.

3. A measuring device for coarse material such as grain, feed-stuff, and the like, a pair of juxtaposed measuring containers, a movable material deflector adapted to communicate with said containers one at a time, a pivoted bottom member adapted to close the lower ends of said containers one at a time, a weighted arm having one end fixed to said bottom at its pivot point, a pivoted lever disposed within each container, a normally opened mercury switch on one end of each of said levers, and a material feeler on the other end of each of said levers, electro-magnetic means connected to each of said switches for engaging the weighted arm and holding the bottom member in position to close the bottom of one of the containers at one time, said electromagnetic means being controlled by said switches one at a time for releasing said arm, and allowing the weight of the material within the container to swing the bottom member on its pivot to where the bottom member will engage the lower end of the other container to close the same, a connection between said bottom member and said deflector for moving the deflector when the bottom member is moved, each of said levers being moved by the weight of the material when the material reaches a predetermined high point in a container, the levers being vertically adjustable in the containers to thereby vary the volume of the material within the container before its bottom is opened and the material is directed to the other container.

4. In a measuring device for coarse material such as grain, feed-stuff, and the like, a pair of side-by-side measuring containers, said containers each having open lower and upper ends, a bottom member pivoted substantially at its center and at a point between the lower open ends of said containers, a weighted arm having one end fixed to the pivot point of said bottom member for holding the bottom member in a position to close the lower end of one of the containers, a pivoted material feeding member disposed above the containers, a connection between said bottom member and the material feeding member for swinging the material feeding member when the bottom is swung to deflect the material into the container whose bottom is closed, a latch for engaging one edge of the weighted arm for holding it in closed position against the weight of material which is being delivered into the container, a solenoid for moving said latch, each of said containers having disposed therein a pivoted material feeling member, each material feeling member having mounted thereon a mercury switch and connections between the switches and the solenoid, the material feeling members being adapted to be engaged by the material in a container when the material reaches a predetermined height to move the material feeling member to thus close its mercury switch and energize said solenoid to move said latch to release said bottom member for swinging movement under the weight of the material in the closed container to allow the contents to flow by gravity from the filled container to thus move the bottom member on its pivot so that it will close the lower end of the other container, said weighted arm on said bottom member having a cam surface on which the lower end of said latch is adapted to ride while the bottom is swung, said latch being adapted to fall by gravity and engage the other side of said weighted arm to likewise hold the bottom in closed position for the other container while it is being filled, the material feeling members being vertically adjustable in the containers to thereby vary the volume of the material within the container before its bottom is opened and the material is directed to the other container.

EDWARD D. WASHBURN.
PINKNEY M. WASHBURN.